United States Patent [19]

Pomfret

[11] 4,365,593

[45] Dec. 28, 1982

[54] WATER-COOLED INTERNAL COMBUSTION ENGINE

[75] Inventor: Colin T. Pomfret, Graz, Austria

[73] Assignee: Hans List, Graz, Austria

[21] Appl. No.: 273,642

[22] Filed: Jun. 15, 1981

[30] Foreign Application Priority Data

Jun. 16, 1980 [AT] Austria .................................. 3179/80

[51] Int. Cl.³ ................................................ F01P 1/02
[52] U.S. Cl. ............................... 123/41.32; 123/41.79; 123/41.82 R
[58] Field of Search ............... 123/41.31, 41.32, 41.72, 123/41.74, 41.76, 41.79, 41.82 R, 41.82 A

[56] References Cited

U.S. PATENT DOCUMENTS

| | | | |
|---|---|---|---|
| 1,731,888 | 10/1929 | De Jong | 123/41.74 |
| 2,722,922 | 11/1955 | Sheppard | 123/41.74 |
| 3,353,522 | 1967 | Ley | 123/41.82 |
| 3,377,996 | 4/1968 | Kotlin et al. | 123/41.82 X |
| 4,066,057 | 1/1978 | Hale | 123/41.74 X |
| 4,106,444 | 8/1978 | Deutschmann et al. | 123/41.82 R |
| 4,131,093 | 12/1978 | Mansfield | 123/41.82 R X |
| 4,175,503 | 11/1979 | Ernest | 123/41.82 R X |

FOREIGN PATENT DOCUMENTS 2825298 11/1979 Fed. Rep. of Germany ... 123/41.82

*Primary Examiner*—William A. Cuchlinski, Jr.
*Attorney, Agent, or Firm*—Watson, Cole, Grindle & Watson

[57] ABSTRACT

In a water-cooled multi-cylinder internal combustion engine the cylinder head is cast without the use of a core for the water jacket and is provided with cast channels of a predominantly longitudinal direction in the area of the upper ends of the cylinders, which are open towards the cylinderhead gasket, and with a bore for the cooling water going lengthwise through the cylinderhead in the vicinity of the valve guides. A continuous cast cooling channel is provided at one of the long sides of the cylinderhead only, which is open towards the cylinderhead gasket and is intended for cooling the upper cylinder ends. At least one inlet bore per cylinder is arranged at the long side opposite of the open cooling channel, which connects to the cooling water chamber in the cylinder block and ends in a crosshole going through the cylinderhead in the area of the valve bridges, or of the bore holding the spark plug or injection device, respectively. Further, all crossholes on the side opposite of the inlet bores end in the open cooling channel serving as a collecting channel, and an additional longitudinal bore is provided on the side of the inlet bores in the area of the upper cylinder ends.

5 Claims, 4 Drawing Figures

FIG. 3
FIG. 4
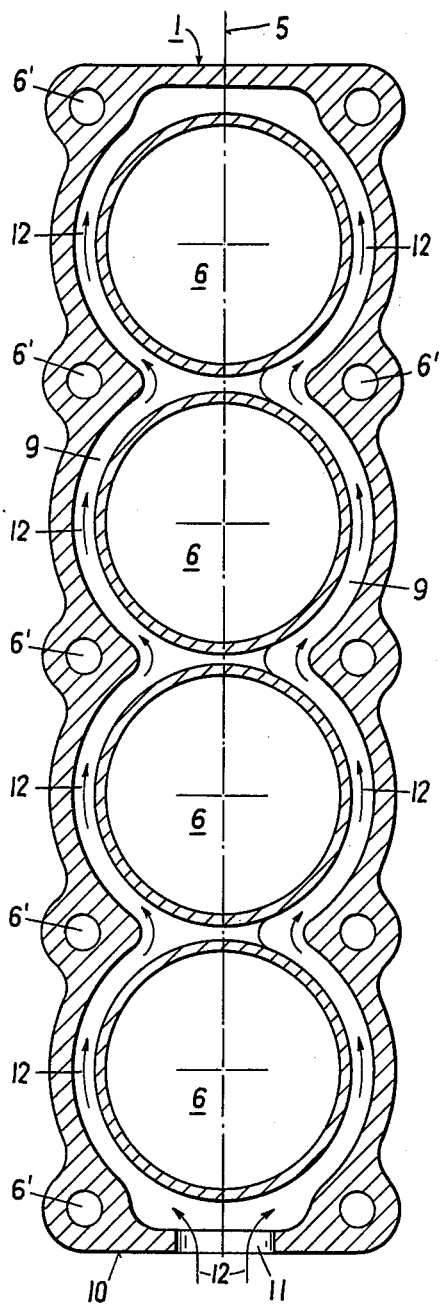
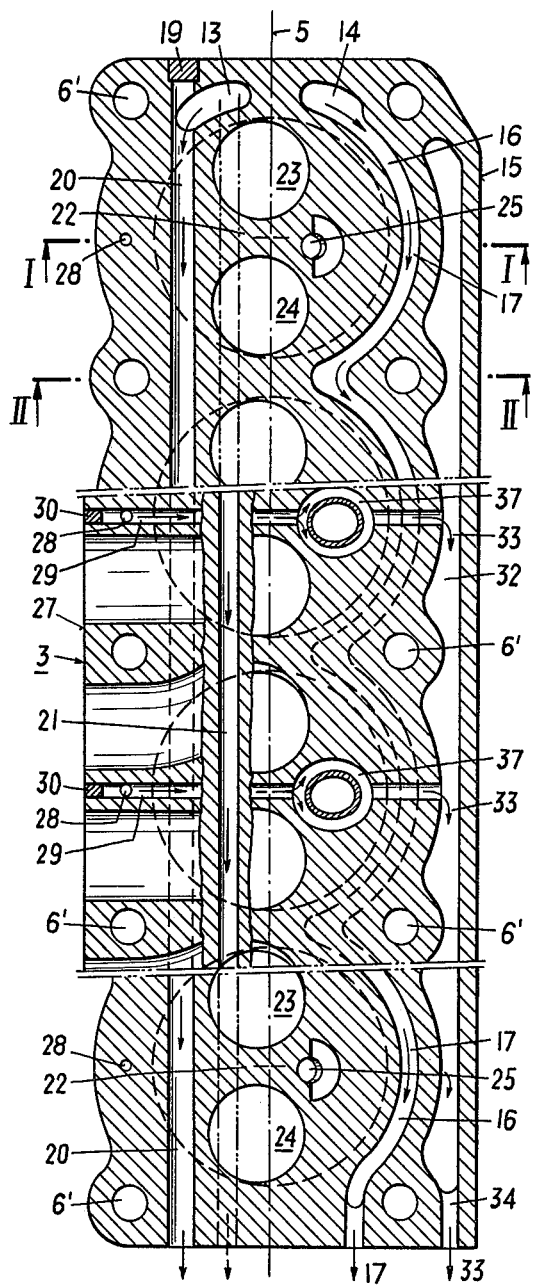

WATER-COOLED INTERNAL COMBUSTION ENGINE

BACKGROUND OF THE INVENTION

The present invention relates to a water-cooled multi-cylinder internal combustion engine whose cylinderhead is cast without the use of a core for the water jacket and is provided with cast channels of a predominantly longitudinal direction in the area of the upper ends of the cylinders, which are open towards the cylinderhead gasket, and with a bore for the cooling water going lengthwise through the cylinderhead in the vicinity of the valve guides.

DESCRIPTION OF THE PRIOR ART

Internal combustion engines of this type are known and offer two main advantages; (a) due to the very small volume of cooling water—especially in the cylinderhead of the combustion engine—the optimum service temperature for economic, non-polluting operation of the engine can be attained within a very short time after start-up, and (b) as the cores for the water jacket which are mainly responsible for the high cost of casting a cylinderhead are not required in this case, the cost of production of the combustion engine can be reduced considerably.

In a known type of design the cooling water enters the cylinder block with its arrangement of connected cylinders at one of its front ends, first of all cooling the outside walls of the cylinders along the long sides of the cylinder block, being separated from the cylinderhead by means of the cylinderhead gasket. In the area of the cylinder most distant from the cooling water entry, the entire stream of cooling water is fed into the cylinder block above through the cylinderhead gasket. Then it enters two separate cooling channels located in the area of the upper cylinder ends which are open towards the cylinderhead gasket, and a longitudinal bore going through the cylinderhead in the vicinity of the valve guides. After the cooling water has passed through the length of the cylinder block it is collected and then drawn off at the same side where it enters the cylinder block.

Although this known type of design will ensure fairly satisfactory cooling of the upper cylinder ends, it does not sufficienty cool the critical hot areas between the open cooling channels alongside the cylinderhead, e.g., the valve bridges or the area around the bore for the spark plug or the injection device, which is of considerable disadvantage in view of the high-performance engines of today.

SUMMARY OF THE INVENTION

It is an object of the present invention to improve internal combustion engines of the aforementioned type in such a way as to achieve satisfactory cooling of all parts of the cylinderhead subject to high temperatures while maintaining the particular way of casting the cylinderhead without the use of a core for the water jacket.

The present invention achieves this by providing a continuous cast cooling channel at one of the long sides of the cylinderhead only, which is open towards the cylinderhead gasket and is intended for cooling the upper cylinder ends, by further providing the cylinderhead with at least one inlet bore per cylinder at the long side opposite of the open cooling channel, which connects to the cooling water chamber in the cylinder block and ends in a crosshole going through the cylinderhead in the area of the valve bridges, or of the bore holding the spark plug or injection device, respectively, by making all crossholes on the side opposite of the inlet bores end in the open cooling channel serving as a collecting channel, and by providing an additional longitudinal bore on the side of the inlet bores in the area of the upper cylinder ends. Through the inlet bores connecting to the cooling water chamber in the cylinder block the cooling water flows into the crossholes going through the cylinderhead in the areas of the valve bridges or of the bores holding the spark plugs or injection devices, which are subject to the high thermal loads, and thus ensures sufficient cooling of these parts. The parallel streams through the individual crossholes guarantee a uniform cooling of each cylinder regardless of its position. The cooling channel serving as a collecting channel for the cooling water flowing in from the crossholes, which runs mainly lengthwise along the cylinderhead and is open towards the cylinderhead gasket, continues to provide for a longitudinal stream of cooling water. For satisfactory cooling of the upper cylinder ends and the adjacent area of the cylinderhead on the side of the inlet bores, another longitudinal bore is provided in the area of the upper cylinder ends, which is supplied with cooling water independently of the cooling water supply for the crossholes.

This design will ensure satisfactory cooling of all parts under high thermal load, although the production costs for the cylinderhead and the amount of cooling water required for the combustion engine are kept as low as possible.

A further enhancement of the invention aims at providing another continuous cooling channel in addition to the open collecting channel, which is placed on the side opposite of the inlet bores and is open towards the cylinderhead gasket; relative to the center plane of the cylinders this additional channel is situated on the inside of the collecting channel and is fed with cooling water at one end of the cylinder block—preferably through a hole in the cylinderhead gasket. Thus the cooling circuit through the crossholes is essentially independent of the cooling water stream flowing in the longitudinal direction of the cylinderhead and supplying the upper ends of the cylinders and the adjacent areas in the cylinderhead, which results in greater reliability and further improvement of the cooling effect.

According to another proposal of the present invention, the upper cylinder ends are separated from each other; in the corresponding area the cylinderhead is provided with an additional cooling channel which runs between the valve of adjacent cylinders and which is open towards the cylinderhead gasket. This is a simple way of further improving the cooling of the high temperature area between the individual valves. These additional channels can be supplied with and/or drained from cooling water by way of suitably placed openings in the cylinderhead gasket which normally seals the channels against the cooling water chamber in the cylinder block, and by connecting them to the main cooling channel.

Enlarging upon the present invention, each receiving bore holding a spark plug or an injection device can be surrounded by an area whose diameter is larger than that of the spark plug or the injection device and which is directly intersected by the crosshole. In this way a ring space is formed around the injection device or the spark plug which is streamed through by the cooling water, thereby ensuring simple and satisfactory cooling of these parts which are rather sensitive to high temperatures.

DESCRIPTION OF THE DRAWINGS

Following is a more detailed description of an exemplary embodiment of the present invention, as illustrated in the enclosed drawings, wherein FIG. 3 is a sectional view along line III—III in FIG. 1, and FIG. 4 is a sectional view along line IVa—IVa in FIG. 1 with regard to the top and bottom parts, and a sectional view along line IVb—IVb in FIG. 1 with regard to the central part.

DESCRIPTION OF THE PREFERRED EMBODIMENT

Figure 1:
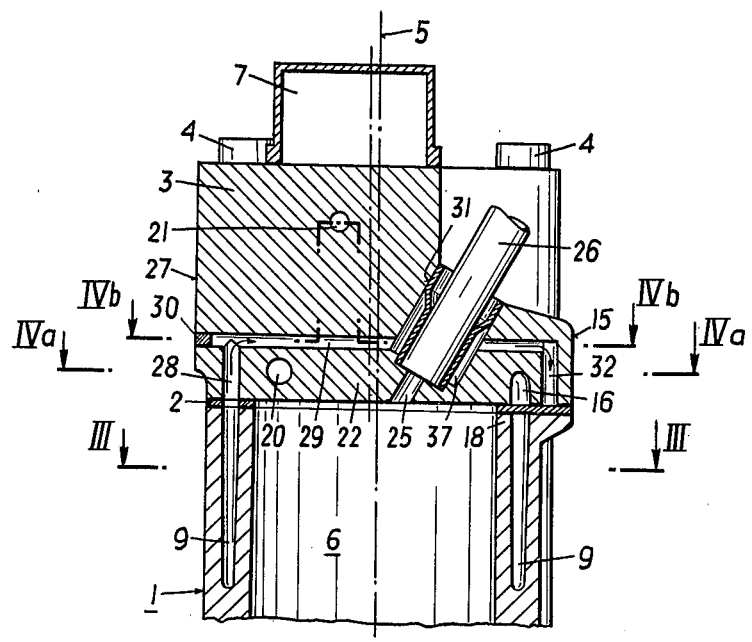
FIG. 1 is a vertical sectional view along line I—I in FIG. 4 of the upper part of an internal combustion engine designed according to this invention.

On top of a cylinder block 1 of an internal combustion engine is placed a cylinderhead 3, the seal between the two parts being effected by a cylinderhead gasket 2. The cylinderhead 3 is fastened to the cylinder block 1 by means of screws 4 accessible from the upper side of the cylinderhead 3. The screws 4 are positioned symmetrically to the center plane 5 of the cylinders 6, going through the cylinderhead 3 and also through parts of the cylinder block 1 in bores 6'. A camshaft housing 7 is schematically indicated on top of the cylinderhead 3 which provides an oil and noise tight cover for the valve drive (not shown).

The cylinders 6 of the depicted four-cylinder internal combustion engine are arranged in line and connected to each other, apart from a separating gap 8. On the long sides of the cylinder block 1 deep recesses which are open towards the cylinderhead gasket are designed to form the cooling water chamber 9 of the cylinder block 1.

As shown in FIG. 3, one of the front ends 10 of the cylinder block 1 has an inlet opening 11 for cooling water, from where the cooling water passes through the cooling water chamber 9 (following arrows 12) in two separate streams flowing along the longitudinal sides of the cylinder block 1. This ensures cooling of the cylinders 6 in the area covered by the cooling water chamber 9. The end of the cylinder block 1 opposite of the inlet opening 11, which is shown as the upper end in FIG. 3, is provided with holes 13, 14 (cf. FIG. 4) in the cylinderhead gasket 2 and corresponding channels in the cylinderhead 3, which allow the cooling water flowing through the cooling water chamber 9 in the cylinder block 1 in the direction of the arrows 12 to rise into the cylinderhead 3. One of the long sides 15 of the cylinderhead 3 is to be provided with a continuous cast cooling channel 16 which is open towards the cylinderhead gasket 2 and will cool the upper ends of the cylinders 6 and the adjacent parts of the cylinderhead 3. Via hole 14 the cooling channel 16 will be supplied with cooling water from the cylinder block 1, which will subsequently flow through the cylinderhead 3 along arrows 17 in an esentially longitudinal direction.

Hole 13 will feed cooling water (a)—as shown in the top and bottom parts of FIG. 4—into a longitudinal bore 20 which goes through the cylinderhead 3 in the vicinity of the upper cylinder ends 18 and is sealed from the outside by means of a plug 19 presented schematically, and (b)—as shown in the central part of FIG. 4—into a bore 21 in the area of the valve guides (not shown) via a corresponding connecting channel. After the cylinderhead has been cast, bores 20 and 21 are drilled mechanically, thereby eliminating the need for expensive cores which would raise the cost of casting the cylinderhead.

For satisfactory cooling of the bridges 22 between the individual valves 23, 24 and the area around the bore 25 holding the spark plug or injection device 26 (presented schematically in FIG. 1 only) the side 27 of the cylinderhead 3 lying opposite of the open cooling channel 16 is provided with at least one inlet bore 28 per cylinder 6, which is connected to the cooling water chamber 9 in the cylinder block 1 and ends in a crosshole 29 through cylinderhead 3 in the area of the valve bridges 22 or the bore 25. After casting the cylinderhead the crossholes 29 are drilled starting from the long side 27 and then stopped with a plug 30, which is presented schematically.

Each bore 25 has a space 31 whose diameter is larger than that of the spark plug or of the injection device, which is directly intersected by the corresponding crosshole 29. On the side opposite of the inlet bores 28 all crossholes 29 end in an additional cooling channel 32 which is used as a collecting channel and is situated outside of the cooling channel 16 with respect to the center plane 5 of the cylinders. Independently of cooling channel 16, the cooling channel 32 collects the cooling water supplied through the crossholes 29, which flows to a corresponding outlet 34 in the direction of the arrows 33.

Figure 2:
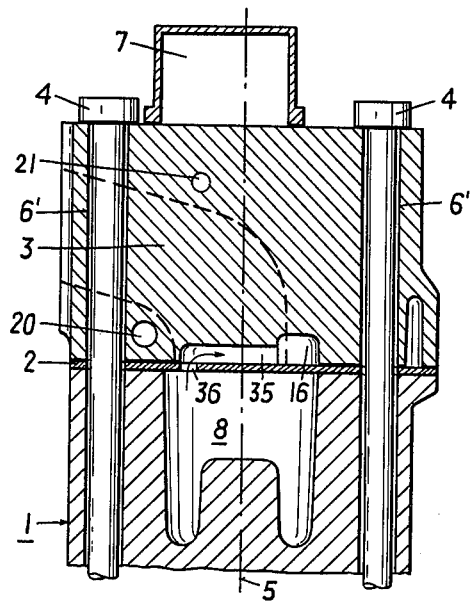
FIG. 2 is a vertical sectional view along line II—II in FIG. 4.

FIG. 2 shows an additional cooling channel 35 which is located near the separating gap 8 and is open towards the cylinderhead gasket 2; channel 35 runs between the valves of adjacent cylinders and feeds the cooling water rising through an opening 36 in the cylinderhead gasket 2 from the cooling water chamber in the cylinder block into the cooling channel 16.

In the embodiment of the invention presented here, cooling of the upper cylinder ends and of the adjacent area of the cylinderhead is effected by way of the cooling channel 16 and the longitudinal bore 20. Independently, another circuit is established via the inlet bore 28, the crosshole 29, the ring space 37 around the spark plug or injection device 26, and via the cooling channel 32 serving as a collecting channel which is responsible for cooling the valve bridges 22 subject to high thermal loads, and for cooling the area around the injection device or the spark plug. Thus a non-uniform heating of the cylinderhead is avoided, while the advantages of simple manufacture of the cylinderhead and a small volume of cooling water are maintained.

Although the separate cooling channel 32 collecting the cooling water from the crossholes 29 offers certain advantages with regard to the flow of cooling water, the design of the present invention would also permit to make the crossholes 29 enter the cooling channel 16 directly, which would further simplify casting of the cylinderhead by omitting the separate collecting channel.

I claim:

1. A water cooled multi-cylinder internal combustion engine, comprising a cylinder block and a cylinderhead which is provided with cast channels of a predominantly longitudinal direction in the area of the upper ends of the cylinders, which are open towards the cylinderhead gasket and streamed through by cooling water, and with a bore for the cooling water extending lengthwise through the cylinderhead in the vicinity of the valve guides, wherein only one of the long sides of said cylinderhead is provided with a continuous cast cooling channel which is open towards the cylinderhead gasket and is intended for cooling the upper cylinder ends, wherein said cylinderhead is provided with at least one inlet bore per cylinder on the long side opposite of said open cooling channel, which connects to the cooling water chamber in the cylinder block and ends in a crosshole extending through said cylinderhead in the area of the valve bridges and of the bore holding the spark plug or injection device, wherein all crossholes on the side opposite said inlet bores end in said open cooling channel serving as a collecting channel, and, finally, wherein an additional longitudinal bore is provided on the side of said inlet bores in said area of the upper cylinder ends, which is separately supplied with cooling water.

2. An internal combustion engine according to claim 1, wherein a continuous cooling channel is provided in addition to said open cooling channel serving as a collecting channel, which is placed on the side opposite of said inlet bores and is open towards said cylinder head gasket, and which is situated on the inside of said collecting channel relative to the center plane of said cylinders.

3. An internal combustion engine according to claim 2, wherein said additional cooling channel is fed with cooling water at one end of said cylinder block through a hole in said cylinderhead gasket.

4. An internal combustion engine according to claim 1, 2 or 3, wherein said upper cylinder ends are separated from each other and said cylinder head is provided in the corresponding area of the separating gap with an additional cooling channel which runs between the valves of adjacent cylinders and is open towards said cylinder head gasket.

5. An internal combustion engine according to claim 1, 2 or 3, wherein each receiving bore for a spark plug or an injection device is surrounded by an area whose diameter is larger than that of the inserted device and which is directly intersected by said crosshole.

* * * * *